US006693657B2

(12) United States Patent
Carroll, Jr. et al.

(10) Patent No.: US 6,693,657 B2
(45) Date of Patent: Feb. 17, 2004

(54) ADDITIVE FOR YAG LASER MARKING

(75) Inventors: James B. Carroll, Jr., Cortlandt Manor, NY (US); Steven A. Jones, Budd Lake, NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/833,355

(22) Filed: Apr. 12, 2001

(65) Prior Publication Data

US 2002/0171732 A1 Nov. 21, 2002

(51) Int. Cl.⁷ .......................... B41J 2/435; G01D 15/14
(52) U.S. Cl. ..................................... 347/224; 430/108.6
(58) Field of Search .......................... 347/224; 430/138, 430/108.6, 531, 527, 530; 252/520.1; 524/430

(56) References Cited

U.S. PATENT DOCUMENTS

| 4,753,863 A | * | 6/1988 | Spanjer ...................... 430/138 |
| 4,822,973 A | | 4/1989 | Fahner et al. ............. 219/121.6 |
| 5,472,640 A | | 12/1995 | Brückner et al. ....... 428/402.24 |
| 5,484,694 A | * | 1/1996 | Lelental et al. .............. 430/530 |
| 5,569,413 A | * | 10/1996 | Jacobson .................. 252/520.1 |
| 5,582,963 A | * | 12/1996 | Tsukada ...................... 430/527 |
| 5,705,328 A | * | 1/1998 | Shiozaki ..................... 430/531 |
| 5,772,924 A | * | 6/1998 | Hayashi et al. ........... 252/520.1 |
| 5,928,780 A | | 7/1999 | Schmidt et al. ............. 428/331 |
| 6,214,917 B1 | * | 4/2001 | Linzmeier et al. ........... 524/430 |

FOREIGN PATENT DOCUMENTS

| CA | 2179698 | 12/1996 |
| DE | 44 15 802 | 11/1995 |
| JP | 61 286224 | 12/1986 |
| JP | 61 224230 | 9/1989 |
| JP | 05-279039 | 10/1993 |

* cited by examiner

*Primary Examiner*—Hai Pham
(74) *Attorney, Agent, or Firm*—Melanie L. Brown

(57) ABSTRACT

A calcined powder of co-precipitated mixed oxides of tin and antimony is used as a YAG laser marking additive. The additive is designed to impart little to no color to the plastic in which it is incorporated but to provide a high contrast dark marking after being exposed to a YAG laser.

20 Claims, No Drawings

ADDITIVE FOR YAG LASER MARKING

BACKGROUND OF THE INVENTION

A number of printing techniques for applying markings to articles, including screen printing and transfer printing, are well known. These are generally surface printing methods which means that the identification mark realized can become unreadable through mechanical damage, abrasion, chemical influences, and the like. Such printing is particularly difficult to apply to curved or textured surfaces and the special tooling costs required add to the overall cost of the product.

The desirability of marking articles through the use of a laser system is well known. Lasers have been developed so that the beam impinged on the article to be marked can be highly focused to provide fine lines in the form of letters and/or numbers of the desired size, as well as images. Lasers permit the marking to be on the surface of the article or beneath the surface. In many instances, it is desirable to have the mark disposed subsurface in order to make it more difficult to remove the indication. Such a subsurface mark, can for example, contribute to anti-counterfeiting efforts. Laser marking, whether surface or subsurface, can also be used, for example, for electronically scanning and control purposes during production.

A number of laser beam processes in which an identification mark is burned into the surface of an article part are known. The resulting rough surface usually has to be coated with a transparent lacquer on account of the danger of contamination and the unpleasant feel that results. This can become a very involved operation in the case of mass produced parts and adds to the cost of the product.

The use of laser beam marking systems for creating subsurface marks is also known. Such systems are based on creating the mark by having the article to be marked be composed of a special configuration of materials or incorporating a material within the article which either becomes visible when exposed to the laser beam or causes something else present to become visible. For example, U.S. Pat. No. 4,822,973 discloses a system in which the laser beam passes through the surface of a first plastic material in order to be absorbed in a layer of a second plastic material. This system requires a special configuration of materials of construction in the part to be marked. Other systems incorporate a quantity of carbon black, coated mica or a highly absorbing green pigment, all of which absorb energy from the laser beam to produce a visible mark. However, these materials have a degree of color which is sufficient to be visible prior to application of the laser beam and that can be unsightly or interfere with the distinctness of the mark after the laser beam has been applied. This disadvantaging characteristic is aggravated by the fact that these additives tend to require a high loading content into the article to be marked, which is not only undesirable because of the effect on appearance but also can effect the physical and mechanical properties of the object. Further, absorbance of the laser beam to cause local heating also causes a degree of foaming which detracts from the creation of a fine and distinct mark, resulting in a blemished product. Moreover, the additives tend to be specific to the wavelength emitted by the laser. For example, materials initially developed for use in conjunction with carbon dioxide lasers tend not to work particularly well (or even at all) with the increasingly popular yttrium aluminum garnet (YAG) lasers which require a material which absorbs at 1064 nm.

It is therefore the object of this invention to provide a YAG laser marking additive which will produce a black or dark mark contrasting with the surrounding area when exposed to YAG laser energy but prior thereto does not impart an appreciable color to the surrounding area or cause a significant change in the performance of the material in which it has been added.

SUMMARY OF THE INVENTION

This invention relates to a YAG laser marking additive and its use. More particularly, the YAG laser marking additive of the present invention is a calcined powder of co-precipitated mixed oxides of tin and antimony. When the powder absorbs YAG laser energy and converts it into heat, carbonization of the surrounding material occurs and results in the formation of a black or dark mark that contrasts to the remainder of the surrounding area. Because of the particle size of the powder and its efficiency, the powder does not impart an appreciable amount of color to the object in which it is incorporated. It also does not cause excess foaming so that the mark achieved is smoother in texture.

DESCRIPTION OF THE INVENTION

In accordance with the present invention, provided is a laser marking additive that is adapted for use in conjunction with a YAG laser. The additive is a calcined powder of co-precipitated mixed oxides of tin and antimony in which the antimony concentration is greater at the surface of the co-precipitate particles than in the interior of the particles. The powder is principally tin oxide and only a small amount of antimony oxide that is expressed as $Sb_2O_3$. The $Sb_2O_3$ level can be up to about 17%. Preferably, the amount of antimony oxide is about 1 to 5% of the tin oxide.

Any procedure which causes the co-precipitate to form preferably at low pH can be employed. One procedure which can be used involves forming a solution from salts or oxides of tin and antimony and then adjusting the conditions so as to cause the oxides to co-precipitate. In this method, the identity of the oxide or salt is not critical and any material can be selected as long as both the tin and antimony reagents can be dissolved in the same solvent. For example, aqueous acidic solutions can be prepared using the oxides, sulfates, fluorides, chlorides, bromides and iodides of the metals, as well as salts of organic acids which are soluble. Tin chloride and antimony oxide are both readily available commercially and these are presently preferred. It is also presently preferred to dissolve these materials in water, with the assistance of a mineral acid if needed or helpful. The mixed oxides can be made to precipitate from such a solution by changing the pH to an appropriate level. Any convenient base can be used to adjust the pH but sodium hydroxide is presently preferred because of its availability. The pH during precipitation is preferably low and by that is meant the pH is less than about 2.6 and more preferably about 1.6 to 2.1.

The resulting precipitate can be recovered from the solution by any convenient means such as filtering or centrifuging and, if desired, washed. The resulting precipitate is thereafter calcined at an appropriate temperature, for example, at least about 550° C. and preferably at least about 650° C., and which usually does not exceed about 750° C. The calcination time is usually at least about 0.5 hour and preferably at least about 1 hour but usually less than about 2 hours. The resulting calcined material is usually a particulate but can, and usually is, thereafter ground or milled to a desired size. It is desirable that the particles have an average size in the range of about 0.1–10 $\mu$m, and more preferably, about 0.5–1 $\mu$m, when measured by light scattering.

The calcination of the co-precipitated material results in a mixed metal oxide containing tin in the +4 oxidation state and antimony in the +3 oxidation state. If the antimony is not present, the material does not effectively function as a YAG laser marking additive. The process described above also results in a tin oxide particle which has been surface-enriched with antimony but whether there is an minimum degree of enrichment necessary to achieve good results has not yet been ascertained. The surface enrichment was analyzed by XPS (X-ray photoelectron spectroscopy) which has a depth of penetration of about 100 Angstroms. In samples analyzed, the surface antimony concentration was at least 15% higher than the antimony concentration as a whole. Whether insufficient surface enrichment has occurred is readily apparent since the material exhibits a beige color and does not effectively operate as a YAG laser marking additive. When sufficient surface enrichment has occurred, the calcined product exhibits a dark to light grey or pale green color depending on the total antimony concentration of the particle. Because of this characteristic, it is not necessary to undertake the time and expense of actually measuring local concentrations of antimony in the particles. Instead, the appearance of the calcined powder can be used to determine if the desired powder has been achieved.

While the calcined product does exhibit a dark to light grey or pale green color, it is also highly efficient as a YAG laser marking additive. That efficiency allows only a small quantity of the powder to be added to the material to be marked and achieve the desired marking attributes. The small quantity permits the gray or pale green color contributed by the marking additive to become well dispersed and diffused into the color which is otherwise exhibited by the object. In general, the marking additive loading is about 0.01–5% of the total weight of the article to be marked, and preferably about 0.05–0.1%.

The laser marking additive of the present invention is incorporated into any material which is transparent to YAG laser irradiation by any convenient method. Dispersing the marking additive within the object is also assisted by the small particle size.

The material to be marked can be an organic object such as a plastic or polymeric article. Typical polymers include, but are not limited to, polyolefins such as polyethylene, polypropylene, polybutadiene and the like; (meth)acrylic polymers such as polyethyl acrylate and polymethyl methacrylate and the like; polyesters such as polyethylene terephthalate and polybutylene terephthalate and the like; polyvinyl chloride; polyvinylidene chloride; polyacrylonitrile; epoxy resins; and polyurethanes. The polymer can also be a copolymer or block copolymer, etc. Conventional additives may be present. The material of which the object is composed is limited only by the necessity of being transparent to YAG laser irradiation.

In order to further illustrate the present invention, various examples are given below. Throughout these examples, as well as throughout the rest of this specification and claims, all parts and percentages are by weight and all temperatures are in degrees Centigrade unless indicated otherwise.

EXAMPLE 1

Preparation of 16.5% $Sb_2O_3$ Sample

A quantity of 38.2 grams of antimony oxide was dissolved in 150 ml of concentrated hydrochloric acid. The resulting solution appeared cloudy. The cloudy solution was then added to 150 ml of water and 590 ml of 76.5% $SnCl_4 \cdot 5H_2O$. The resulting antimony-tin solution was added to 500 ml of water that was being maintained at 75° C. and a pH of 1.6. The solution was added at a rate of 4.5 g/minute with 35% sodium hydroxide being used to maintain the pH at 1.6. The reaction mixture was filtered to obtain an orange-yellow filter cake. This was calcined for 2 hours at 650° C. to obtain a medium grey colored free-flowing powder that was then milled to 0.5 $\mu$m particle size.

EXAMPLE 2

Marking with Example 1 Product

A charge of 0.1 wt % of the calcined powder of co-precipitated mixed oxides of tin and antimony of Example 1 plus 0.5% $TiO_2$ was added to polypropylene and dispersed therein and injection molded into a flat plaque. The appearance of the unmarked plaque was $L^*=82.0$, $a^*=-1.5$, $b^*=1.1$. A YAG laser beam was imposed on the resulting plaque using a current of 14 amps, a pulse frequency of 6 kHz, a scan velocity of 300 mm/sec. and an aperture of 0.05. It was found that distinct lines having a width of about 0.1 mm could be achieved. This was a result of the laser marking additive absorbing the YAG laser energy and converting it to heat so as to carbonize the surrounding polymeric material, thereby making a black or dark mark which was in contrast to the surrounding area.

EXAMPLE 3

Preparation of Tin Oxide Powder

A flask with 500 ml of water was initially heated to 75° C. and the pH was adjusted to 1.6. To the flask, 578 g of 78.1% $SnCl_4 \cdot 5H_2O$ solution was added at 4.5 g/min, while NaOH was added as needed to hold pH at 1.6. After the addition was complete, the slurry was filtered and the particles were washed 4 times with 500 ml portions of water. The filtercake was dried for 1 hr at 120° C. and then calcined for 30 min at 650° C. The calcined product had an off white color.

EXAMPLE 4

Marking with Example 3 Product

The marking procedure in Example 2 was used except that 0.01 wt % of the calcined powder of Example 3 and 0.2% $TiO_2$ were substituted for the powder of Example 1 and 0.5% $TiO_2$. Only a faint mark was produced when only tin oxide was used without the antimony doping.

EXAMPLE 5

Marking with $Sb_2O_3$ Powder

The $Sb_2O_3$ used in these experiments was marked as is using the process of Example 4 by substituting powdered $Sb_2O_3$ for the tin oxide powder. A negligible mark was produced when only antimony oxide was used without being doped into the tin oxide.

EXAMPLE 6

Preparation of 4.7 wt % $Sb_2O_3$ Sample 9.55 grams of antimony oxide were added slowly and with stirring to 300 ml of 36% hydrochloric acid. The resulting solution was then mixed with 590 grams of a 76.5% $SnCl_4 \cdot 5H_2O$ solution. A flask was charged with 500 ml of distilled water that was heated to 75° C. and stirred at 320 rpm. The pH of the water was adjusted to 1.6. The antimony-tin solution was then added to the flask at a rate of 4.5 g/minute and quantities of 35% sodium hydroxide as required to maintain the pH at 1.6 were simultaneously added. After all of the antimony-tin solution had been added, the precipitate was filtered and the recovered particles were washed 4 times with 500 ml portions of water. The resulting washed particles were then calcined for 2 hours at 650° C. and milled to 0.5 μm particle size. The sample was a dull gray green color.

EXAMPLE 7

Marking of Example 6 Product

The marking procedure in Example 4 was used except only 0.02 wt % of the calcined powder of Example 6 was used instead of the tin oxide powder. A distinctive mark was obtained.

EXAMPLE 8

Preparation of 1.9 wt % $Sb_2O_3$ Sample

The procedure in Example 6 was repeated but only 3.83 g of antimony oxide were used. The resulting powder had a pale green color.

EXAMPLE 9

Marking of Example 8 Product

The marking procedure in Example 4 was used except only 0.06 wt % of the calcined powder of Example 8 was used in place of the tin oxide powder. A distinctive mark was obtained.

EXAMPLE 10

Alternate Preparation 3.82 g of $Sb_2O_3$ were dissolved in 300 ml of conc. HCl. The resulting solution was mixed with 578 g of 78.1% $SnCl_4.5H_2O$ solution. A flask with 500 ml of water was initially heated to 75° C. and the pH was adjusted to 1.6. The Sb-Sn solution was added to the flask at 4.5 g/min, while NaOH was added as needed to hold the pH at 1.6. After the addition complete, the slurry was filtered and the particles were washed 4 times with 500 ml of water. The filtercake was dried for 1 hr at 120° C. and calcined for 30 min at 650° C. The resulting pale green powder was milled.

EXAMPLE 11

Alternate Preparation

The procedure in Example 10 was repeated with the only change being that the addition rate was 3 g/min. The resulting powder was yellow-green in color.

EXAMPLE 12

Alternate Preparation

The procedure in Example 10 was repeated with the following changes. The pH was 2.6 and the calcination temperature was 550° C. The resulting powder was pale green in color.

EXAMPLE 13

Alternate Preparation

The procedure in Example 12 was also repeated changing the calcination temperature to 750° C. and also resulted in a powder with a pale green color.

EXAMPLE 14

Alternate Preparation

The procedure in Example 10 was repeated with the following changes. The initial reaction temperature was 45° C., the pH was 2.6, and the addition rate was 6 g/min. The resulting powder was pale yellow green in color.

EXAMPLE 15

Alternate Preparation

The procedure in Example 10 was repeated using only 1.96 g of $Sb_2O_3$. The resulting powder was light greenish yellow in color.

EXAMPLE 16

Alternate Preparation

The procedure in Example 10 was repeated using only 0.97 g of $Sb_2O_3$. The resulting powder was pale yellow green in color.

EXAMPLES 17–23

Marking with Examples 10–16 Products

The marking procedure of Example 4 was repeated with each of the products of examples 10 through 16, where the loading was at 0.1 wt %. In each instance, a distinctive mark was obtained. The appearance of each unmarked plaque is listed in the table below and compared to a plaque with only $TiO_2$.

| Example | L* | a* | b* |
|---|---|---|---|
| 0.2% $TiO_2$ | 88.1 | −1.1 | −2.6 |
| 10 | 85.4 | −1.65 | 1.47 |
| 11 | 86.8 | −0.1 | 3.6 |
| 12 | 85.1 | −0.1 | 4.0 |
| 13 | 86.2 | −0.8 | 3.7 |
| 14 | 86.4 | −0.6 | 4.1 |
| 15 | 84.3 | −1.2 | 5.8 |
| 16 | 85.3 | −1.4 | 4.7 |

EXAMPLES 24 and 25

Marking of Different Polymers

The marking procedure of Example 4 was repeated with the products of Example 10 except that the following plastics were substituted for the polypropylene. In each instance, a distinctive mark was obtained.

| Example | Polymer |
|---|---|
| 24 | PETG |
| 25 | ABS |

EXAMPLE 26

Comparative

Example 10 was repeated except that the pH was held at 7 during the coprecipitation. The resulting product had an off-white color.

EXAMPLE 27

Marking of Example 26

Marking in accordance with Example 17 was done using the calcined powder of Example 26. A negligible mark was produced.

Various changes can be made in the process and products of the present invention without departing from the spirit and scope thereof. The various embodiments which have been described herein were for the purpose of further illustrating the invention but were not intended to limit it.

What is claimed is:

1. A YAG laser marking additive comprising a calcined powder consisting of co-precipitated mixed oxides of antimony and tin in which the antimony is at a higher concentration at the surface of the particle than in the particles as a whole.

2. The YAG laser marking additive of claim 1 in which the antimony oxide is up to about 17 wt % of the mixed oxide.

3. In a method of laser marking an article containing a laser marking additive therein by impinging a laser beam on the article, the improvement which comprises utilizing a YAG laser and utilizing the laser marking additive of claim 2.

4. The YAG laser marking additive of claim 1 wherein the antimony oxide is about 2–5 wt % of the mixed oxide.

5. In a method of laser marking an article containing a laser marking additive therein by impinging a laser beam on the article, the improvement which comprises utilizing a YAG laser and utilizing the laser marking additive of claim 4.

6. The YAG laser marking additive of claim 1 wherein the powder has a particle size of 0.1–10 µm.

7. In a method of laser marking an article containing a laser marking additive therein by impinging a laser beam on the article, the improvement which comprises utilizing a YAG laser and utilizing the laser marking additive of claim 6.

8. The YAG laser marking additive of claim 1 wherein the powder has a particle size of 0.5–5 µm.

9. The YAG laser marking additive of claim 8 wherein the antimony oxide is about 2–5 wt % of the mixed oxide.

10. In a method of laser marking an article containing a laser marking additive therein by impinging a laser beam on the article, the improvement which comprises utilizing a YAG laser and utilizing the laser marking additive of claim 9.

11. In a method of laser marking an article containing a laser marking additive therein by impinging a laser beam on the article, the improvement which comprises utilizing a YAG laser and utilizing the laser marking additive of claim 8.

12. In a method of laser marking an article containing a laser marking additive therein by impinging a laser beam on the article, the improvement which comprises utilizing a YAG laser and utilizing the laser marking additive of claim 1.

13. A method of making a YAG laser marking additive consisting of co-precipitated mixed oxides of antimony and tin comprising coprecipitating mixed oxides of antimony and tin at a pH of less than about 2.6 and calcining the resulting coprecipitate.

14. The method of claim 13, wherein the pH is about 1.6 to 2.1.

15. The method of claim 13, wherein the antimony oxide is up to about 17 wt % of the mixed oxide.

16. A YAG laser markable article comprising a body of material which is transparent to a YAG laser beam and which contains a YAG laser marking additive comprising a calcined powder consisting of co-precipitating mixed oxides of tin and antimony.

17. The laser markable article of claim 16 wherein the antimony oxide in the powder is up to about 17 wt % of the mixed oxide and the powder has a particle size of 0.1–10 µm.

18. The laser markable article of claim 17 wherein the laser marking additive is present in an amount of about 0.01–5 wt % of the article.

19. The laser markable article of claim 18 wherein the antimony oxide in the powder is about 2–5 wt % of the mixed oxide and the powder has a particle size of 0.5–5 µm.

20. The laser markable article of claim 18 wherein the antimony oxide in the powder is about 2–5 wt % of the mixed oxide and the laser marking additive is present in an amount of about 0.05–0.1 wt % of the article.

* * * * *